United States Patent
Sim et al.

(10) Patent No.: US 12,476,808 B2
(45) Date of Patent: Nov. 18, 2025

(54) CRYPTOGRAPHIC PROCESSOR DEVICE AND DATA PROCESSING APPARATUS EMPLOYING THE SAME

(71) Applicant: POSTECH Research and Business Development Foundation, Pohang-si (KR)

(72) Inventors: Jae Yoon Sim, Pohang-si (KR); Byung Jun Kim, Daegu (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 270 days.

(21) Appl. No.: 18/190,922

(22) Filed: Mar. 27, 2023

(65) Prior Publication Data

US 2023/0318829 A1 Oct. 5, 2023

(30) Foreign Application Priority Data

Mar. 31, 2022 (KR) .................. 10-2022-0040094

(51) Int. Cl.
 *H04L 9/30* (2006.01)
 *H04L 9/08* (2006.01)
(52) U.S. Cl.
 CPC .......... *H04L 9/3093* (2013.01); *H04L 9/0852* (2013.01)
(58) Field of Classification Search
 CPC ....... H04L 9/3093; H04L 9/0852; H04L 9/50; H04L 2209/122
 See application file for complete search history.

(56) References Cited

U.S. PATENT DOCUMENTS 11,265,163 B2 * 3/2022 Poeppelmann ....... H04L 9/0662
11,798,435 B2 * 10/2023 Poeppelmann .......... G09C 1/00
(Continued)

FOREIGN PATENT DOCUMENTS

KR 10-1997-0016937 A 4/1997
KR 10-2017-0061411 A 6/2017
(Continued)

OTHER PUBLICATIONS

Valencia et al. The Design Space of the Number Theoretic Transform: a Survey, 2017, IEE, pp. 273-277. (Year: 2017).*

*Primary Examiner* — Lynn D Feild
*Assistant Examiner* — Abdullah Almamun
(74) *Attorney, Agent, or Firm* — Morgan, Lewis & Bockius LLP

(57) ABSTRACT

The present disclosure provides a cryptographic processor device capable of performing the post-quantum cryptographic encryption with in a high speed with low power, allowing a change of encryption parameters, and handling various cryptographic protocols. The cryptographic processor device executing polynomial vector operations required for a post-quantum cryptography includes: a polynomial memory bank configured to store a plurality of polynomial vectors; and an arithmetic and logic operator configured to perform operation on the polynomial vectors. The arithmetic and logic operator includes a transform operation circuit configured to multiply two polynomial vectors read out from the polynomial memory bank by using a predetermined transform operation including a plurality of operation stages, and including a combined operation unit configured to consecutively perform a first stage operation and a second stage operation among the plurality of operation stages without storing a result of the first operation stage in a memory.

17 Claims, 12 Drawing Sheets

(56) References Cited

U.S. PATENT DOCUMENTS

| | | | |
|---|---|---|---|
| 11,847,938 B2 * | 12/2023 | Renes | G06F 7/722 |
| 11,922,135 B2 * | 3/2024 | Yonemura | G06F 7/725 |
| 2010/0064142 A1 * | 3/2010 | Matsuzaki | G06F 7/728 |
| | | | 713/189 |
| 2015/0006604 A1 * | 1/2015 | Ng | G06F 17/142 |
| | | | 708/404 |
| 2018/0294950 A1 | 10/2018 | Khedr et al. | |
| 2020/0265167 A1 * | 8/2020 | Banerjee | H04L 9/0631 |
| 2022/0006630 A1 | 1/2022 | Ghosh et al. | |
| 2022/0231832 A1 * | 7/2022 | Hwang | H04L 9/0861 |
| 2023/0188322 A1 * | 6/2023 | Bajpeyi | H04L 9/0618 |
| 2023/0269067 A1 * | 8/2023 | Son | H04L 9/008 |
| | | | 380/28 |

FOREIGN PATENT DOCUMENTS

| | | |
|---|---|---|
| KR | 10-1952547 A | 2/2019 |
| KR | 10-2019-0084852 A | 7/2019 |
| KR | 10-2019-0138815 A | 12/2019 |

\* cited by examiner

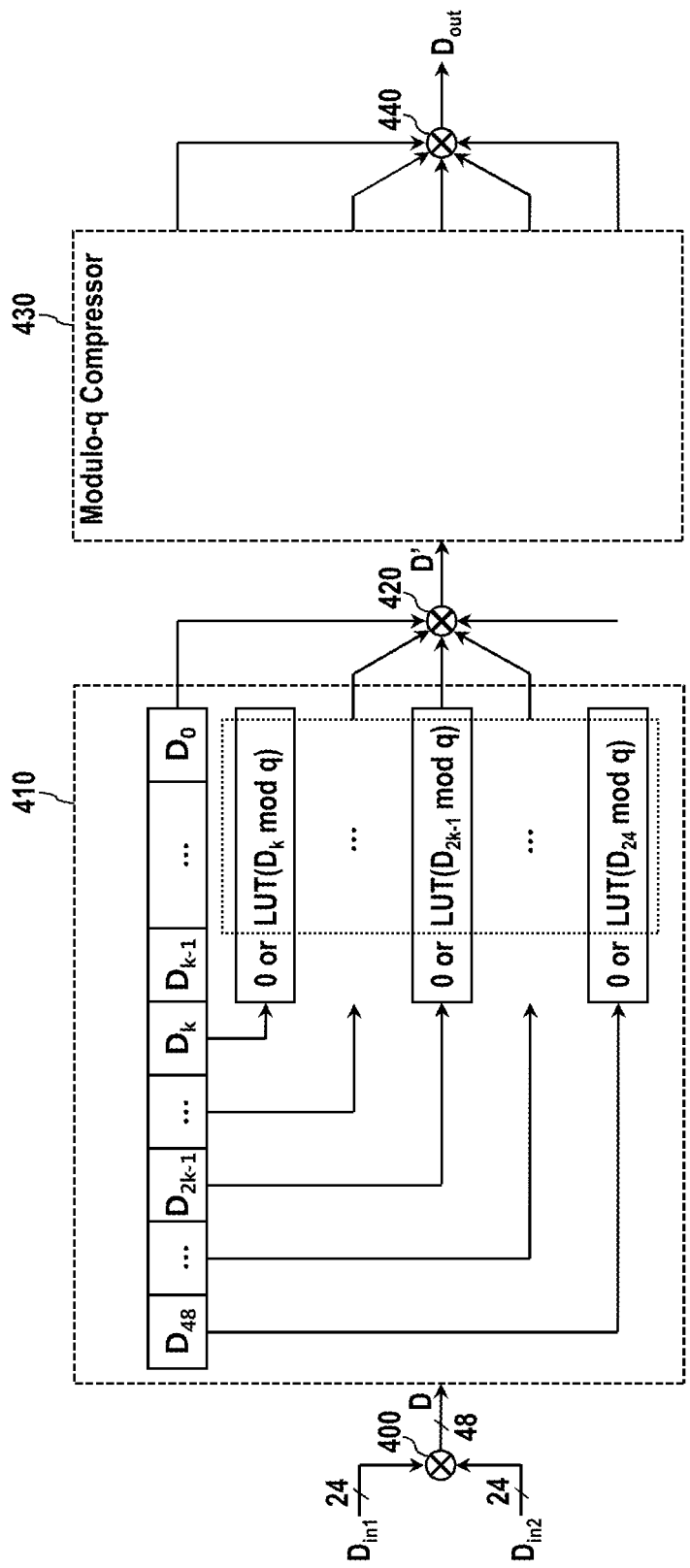

CRYPTOGRAPHIC PROCESSOR DEVICE AND DATA PROCESSING APPARATUS EMPLOYING THE SAME

CROSS-REFERENCE TO RELATED APPLICATIONS

This application claims priority to Korean Patent Applications No. 10-2022-0040094, filed on Mar. 31, 2022, with the Korean Intellectual Property Office (KIPO), the entire content of which is hereby incorporated by reference.

BACKGROUND

1. Technical Field

The present disclosure relates to an encryption device and, more particularly, to an encryption device that performs encryption using post-quantum cryptography (PQC).

2. Related Art

Public key encryption algorithms are used for enhancing confidentiality, integrity, and non-repudiation in various fields including Internet security, authentication, and blockchain. The public-key encryption protocols such as Rivest-Shamir-Adleman (RSA) and elliptic curve cryptography (ECC) are based on hardness of factorization and discrete algebra problems in the current computing environment. However, it is known that a quantum computer having a sufficient scalability may solve the factorization and discrete algebra problems very quickly according to Shor's algorithm. Therefore, the quantum computer is emerging as a serious security threat to the public key encryption algorithm such as the RSA and the ECC, and a post-quantum cryptography protocol that is difficult to solve not only by the current computers but also by the quantum computers are required.

The post-quantum cryptography is a new cryptographic system for responding to security threats possibly caused by quantum computers, and is expected to become a public key encryption system that is safe in the current computing environment as well as in the quantum computer environment. In the post-quantum cryptography, encryption algorithms are designed based on lattice, code theory, or multivariate polynomial problems which is difficult to solve efficiently by the quantum computers as well as current computers instead of the factorization and discrete algebra problems. The National Institute of Standards and Technology (NIST) of the United States is on a way of the post-quantum cryptography standardization process.

After the completion of the international and national standardizations of the post-quantum cryptography, it is expected that various devices which require secure communications or data storage will adopt and use the post-quantum secure cryptography. However, while the post-quantum cryptography is robust against third party attacks owing to the mathematical hardness of solving the problems on which the algorithms are based, the devices formally using the cryptographic algorithm themselves require a lot of time and expenses for the calculation. For example, the encryption of data by a Learning with Error (LWE) protocol, which is one of most promising lattice-based protocols, requires lots of operations including multiplications of matrices and inner products of vectors along with samplings of errors in a Gaussian distribution. Such operations require large computing power, and typical microprocessor or microcontroller-based devices may not be able to handle the computational loads. In particular, number theoretic transforms which are widely used in the cryptographic protocols require a large memory and involve complex memory access patterns, which may result in a decrease in a computational speed.

Computational load and speed issues may hinder a prevalence and use of the post-quantum cryptography. In particular, small devices distributed in an Internet-of-Things or Internet-of-Everything network may not be able to adopt the post-quantum cryptographic protocols due to the computational loads, which may significantly endanger security functions such as confidentiality, integrity, and non-repudiation in the Internet security, authentication, or block chain network. In addition, most business and home PCs that require secure communications when accessing the Internet may not be able to adopt the post-quantum cryptography or may require system upgrades to higher specifications, which may cause inconveniences and dissatisfaction to users.

Therefore, a device which is capable of performing the post-quantum cryptographic encryption in a high speed with low power and does not require high implementation costs and operational expenses is needed. In particular, it is desirable that such a device allows a change of encryption parameters and is capable to handling various encryption protocols.

SUMMARY

Provided is a cryptographic processor device capable of performing the post-quantum cryptographic encryption with in a high speed with low power, allowing a change of encryption parameters, and handling various cryptographic protocols.

Provided is a data processing apparatus including a cryptographic processor device capable of performing the post-quantum cryptographic encryption with in a high speed with low power, allowing a change of encryption parameters, and handling various cryptographic protocols, and a main processor device configured to operate and control the cryptographic processor device by applying commands to the cryptographic processor device.

According to an aspect of an exemplary embodiment, a cryptographic processor device executing polynomial vector operations required for a post-quantum cryptography operations includes: a polynomial memory bank configured to store a plurality of polynomial vectors; and an arithmetic and logic operator configured to perform operation on the polynomial vectors. The arithmetic and logic operator includes a transform operation circuit configured to multiply two polynomial vectors read out from the polynomial memory bank by using a predetermined transform operation including a plurality of operation stages, and including a combined operation unit configured to consecutively perform a first stage operation and a second stage operation among the plurality of operation stages without storing a result of the first operation stage in a memory.

The transform operation circuit may include a sequence reordering unit configured to rearrange input coefficients belonging to any one of the two polynomial vectors, and the combined operation unit configured to receive sequence-arranged input coefficients and consecutively perform the first stage operation and the second stage operation on the sequence-arranged input coefficients.

The predetermined transform may be Number Theoretic Transform (NTT).

The combined operation unit may include a circuit having a 4-to-4 bijection structure in which a pair of butterfly circuits connected in series are connected in parallel.

The combined operation unit may perform a NTT operation according to Cooley-Tukey algorithm or an inverse NTT operation according to Gentleman-Sande algorithm in response to a mode control signal.

The arithmetic and logic operator may include: a lookup table configured to store modular operation values, for a particular modulus, of binary numbers corresponding to digits having a value of 1 among the bit positions of an operand of a modular operation; and a modular multiplication operation circuit configured to perform a modular multiplication of two numbers by utilizing the modular operation values stored in the lookup table.

The modular multiplication operation circuit may be suitable for performing a modulo-q multiplication, where q is a k-bit number. The modular multiplication operation circuit may include: a multiplier configured to perform a normal multiplication on the two numbers and output an intermediate multiplication result; a first adder configured to add lower k bits of the intermediate multiplication result and modular-q values of the binary numbers corresponding to the digits having the value of 1 among the bit positions higher than the k bits of the intermediate multiplication result to output an addition result; and a second adder configured to add lower k bits of the addition result and modular-q values of binary numbers corresponding to digits having the value of 1 among bit positions higher than the k bits of the addition result.

The cryptographic processor device may further include a polynomial sampler configured to generate random numbers and determine at least some of the plurality of polynomial vectors based on the random numbers by a sampling.

The polynomial memory bank may include three memory banks.

The cryptographic processor device may further include a twiddle factor memory bank configured to store twiddle factors necessary for the transform operation.

According to another aspect of an exemplary embodiment, a cryptographic processor device includes: a cryptographic processor configured to execute polynomial vector operations required for a post-quantum cryptography; and an interface controller configured to control an operation of the cryptographic processor and provide an interface with an external device. The cryptographic processor includes: a polynomial memory bank configured to store a plurality of polynomial vectors; and an arithmetic and logic operator configured to perform operation on the polynomial vectors. The arithmetic and logic operator includes a transform operation circuit configured to multiply two polynomial vectors read out from the polynomial memory bank by using a predetermined transform operation including a plurality of operation stages, and including a combined operation unit configured to consecutively perform a first stage operation and a second stage operation among the plurality of operation stages without storing a result of the first operation stage in a memory.

The transform operation circuit may include: a sequence reordering unit configured to rearrange input coefficients belonging to any one of the two polynomial vectors; and the combined operation unit configured to receive sequence-arranged input coefficients and consecutively perform the first stage operation and the second stage operation on the sequence-arranged input coefficients.

The predetermined transform may be Number Theoretic Transform (NTT). The combined operation unit may include a circuit having a 4-to-4 bijection structure in which a pair of butterfly circuits connected in series are connected in parallel.

The arithmetic and logic operator may include: a lookup table configured to store modular operation values, for a particular modulus, of binary numbers corresponding to digits having a value of 1 among the bit positions of an operand of a modular operation; and a modular multiplication operation circuit configured to perform a modular multiplication of two numbers by utilizing the modular operation values stored in the lookup table.

The modular multiplication operation circuit may be suitable for performing a modulo-q multiplication, where q is a k-bit number. The modular multiplication operation circuit may include a multiplier configured to perform a normal multiplication on the two numbers and output an intermediate multiplication result; a first adder configured to add lower k bits of the intermediate multiplication result and modular-q values of the binary numbers corresponding to the digits having the value of 1 among the bit positions higher than the k bits of the intermediate multiplication result to output an addition result; and a second adder configured to add lower k bits of the addition result and modular-q values of binary numbers corresponding to digits having the value of 1 among bit positions higher than the k bits of the addition result.

According to yet another aspect of an exemplary embodiment, a data processing apparatus includes: a main processor; and a cryptographic processor configured to execute polynomial vector operations required for a post-quantum cryptography according to instructions and parameters from the main processor. The cryptographic processor includes a polynomial memory bank configured to store a plurality of polynomial vectors; and an arithmetic and logic operator configured to perform operation on the polynomial vectors. The arithmetic and logic operator includes a transform operation circuit configured to multiply two polynomial vectors read out from the polynomial memory bank by using a predetermined transform operation including a plurality of operation stages, and including a combined operation unit configured to consecutively perform a first stage operation and a second stage operation among the plurality of operation stages without storing a result of the first operation stage in a memory.

The cryptographic processor device according to an embodiment of the present disclosure may quickly perform various lattice-based post-quantum cryptographic protocols with low power by using a general purpose modular operator hardware and Number-Theoretic Transform (NTT) hardware enhancing a memory access efficiency.

Since a sampling circuit is implemented in hardware according to an exemplary embodiment, the hash function and the sampler circuit may operate in parallel, which may increase the sampling speed. The modular multiplier may be implemented universally using look-up table (LUT), and the modular multiplication may be performed in any number system simply by changing data in the LUT. In addition, when there are lots of modular multipliers, the modular multipliers may share the LUT. Since the operation circuit is designed such that the NTT operation are performed in parallel, unnecessary memory access may be reduced by a half while the NTT algorithm is performed by using 2×2 operators, and the NTT may be performed 4 times faster than using a single operator owing to the parallel operation. Further, the reduction of memory accesses may decrease the energy consumption about by a half. Therefore, the cryptographic processor device may serve as an accelerator processor that universally supports the lattice-based post-quantum cryptographic protocols, and may quickly and efficiently perform the operations such as the sampling, the modular multiplication, and the NTT.

The cryptographic processor device according to an exemplary embodiment may be applicable to any application device that performs the lattice-based post-quantum cryptographic algorithm and used for a secure cryptographic protocol. For example, the application device may be an IoT device, any other client device or server device, or a stand-alone device.

The cryptographic processor device may be provided separately from the main processor device to cooperate with the main processor device, but may be integrated with the main processor device.

The scopes of functions performed by the cryptographic processor may be variously modified. In one embodiment, the cryptographic processor may be configured to perform any task related to an encryption or a cryptographic key generation, for example. In another embodiment, the cryptographic processor may be configured to perform only the operations that require hundreds of thousands of clock cycles or more such as the NTT, the INTT, and the sampling.

BRIEF DESCRIPTION OF DRAWINGS

FIG. 10 is a circuit diagram of a modular multiplication circuit according to an exemplary embodiment of the present disclosure;

DETAILED DESCRIPTION OF THE EMBODIMENTS

Figure 1:
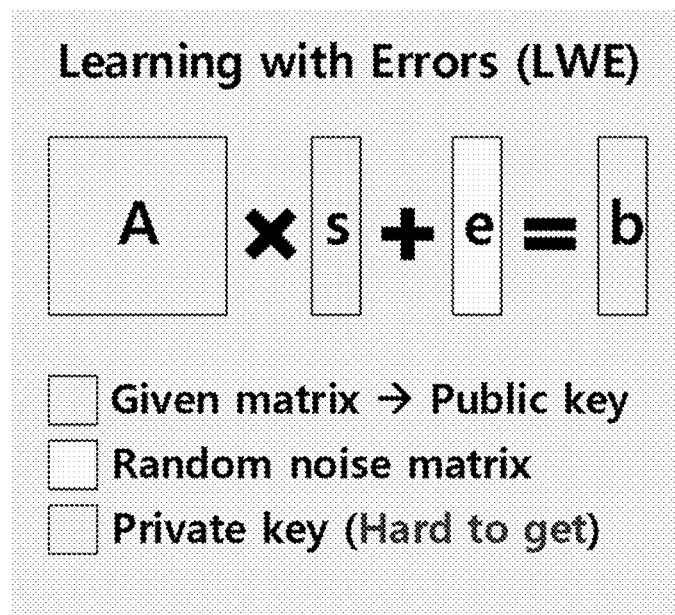
FIG. 1 shows a matrix equation acting as a mathematical foundation for Ring Learning with Errors (RLWE)-based cryptographic algorithm.

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

First, a theoretical basis of Ring Learning with Errors (RLWE) encryption protocol is described briefly. FIG. 1 shows a matrix equation acting as a mathematical foundation of RLWE encryption algorithms.

Assuming that $\mathbb{Z}_q$ denotes $\mathbb{Z} \cap (-q/2, q/2)$ and q is a positive integer, a ring of a polynomial with modulus $X^n+1$ and coefficients $\mathbb{Z}_q$ may be expressed by a quotient $\mathbb{Z}_q[X]/(X^n+1)$. Here, the polynomials are indicated in bold faces, and multiplication operations in $R_q$ may be indicated by *. [r] denotes an operation that rounds a real number r to a nearest integer. Positive integers n and q, and an irreducible cyclotomic polynomial $f(X) \in \mathbb{Z}$ are given, a ring of a polynomial may be defined as above.

It is assumed that $\chi$ is a distribution in $R_q$ that enables a sampling such that e has a small coefficient, D is a distribution of s in $R_q$, and A is uniformly and randomly selected in $R_q$. Among RLWE problems, a decision RLWE problem is distinguishing a uniform distribution from $(A, A *s+e) \in R_q^2$ in $R_q^2$, and a search RLWE problem is finding s when $(A, A *s+e) \in R_q^2$ is given. In case of the search RLWE problem, when the elements of the matrix A representing the polynomial are uniformly and randomly sampled and the elements of an error polynomial or an error matrix e are sampled in an appropriate error distribution x, it is very difficult to determine the secret polynomial or the secret matrix s.

In other words, when the matrices A and s are determined by the uniform random sampling, a noise matrix e of which elements are smaller than a predetermined modulus is determined by a noise sampling, and then the matrix b is determined by matrix multiplications and additions in the equation of FIG. 1, it is very difficult to find the secret matrix s even if the two matrices A and b are known. The secret matrix s may be easily calculated if there is no noise matrix e, but the existence of the noise matrix e composed of small random numbers makes the calculation of the secret matrix s difficult. Therefore, the combinations of the matrices (A, b) may be used as a public key while the secret matrix s may be used as a private key. Such a RLWE cryptographic algorithm may be used for public key-based encryption, digital signature, and key exchange protocols.

Figure 2:
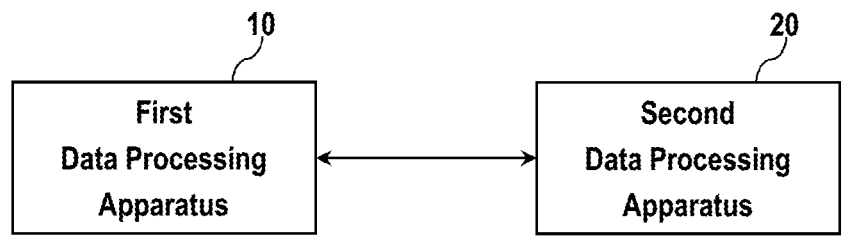
FIG. 2 is a block diagram of a communication system according to an exemplary embodiment of the present disclosure.

FIG. 2 is a block diagram of a communication system according to an exemplary embodiment of the present disclosure. The communication system shown in the drawing may include a first data processing apparatus 10 and a second data processing apparatus 20. The first data processing apparatus 10 and the second data processing apparatus 20 may be connected to each other through a wired or wireless communication link to perform communications through the communication link. During the communication process, the first data processing apparatus 10 and the second data processing apparatus 20 may encrypt transmit data according to a post-quantum cryptographic protocol such as the RLWE-based encryption algorithm and decrypt encrypted data received from the other side to enhance the security and/or implement an authentication function. The first data processing apparatus 10 communicating with the second data processing apparatus 20 may be a network server or a client device. In particular, the first data processing apparatus 10 may be an authentication server configured to authenticate the user identity or a qualification of each user for a specific service. For example, the first data processing apparatus 10 may be a cloud server or a storage server that stores and/or processes data received from the second data processing apparatus 20. Alternatively, the first data processing apparatus 10 may be a storage server of another type. Meanwhile, the first data processing apparatus 10 may be a personal device such as a general PC or a smartphone. On the other hand, the first data processing apparatus 10 may be an IoT device.

Figure 3:
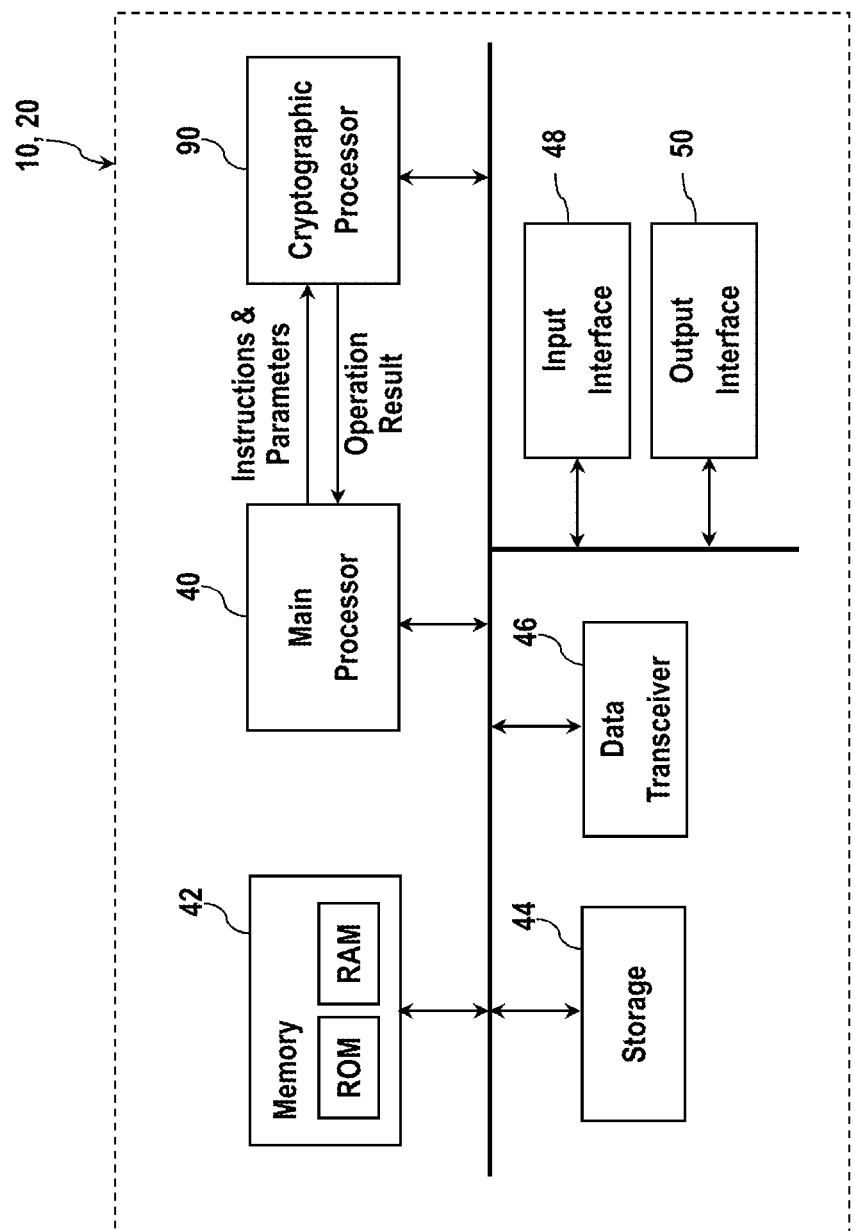
FIG. 3 is a block diagram of an exemplary embodiment of the data processing device shown in FIG. 2.

FIG. 3 is a block diagram of an exemplary embodiment of the first and second data processing apparatuses 10 and 20 shown in FIG. 2.

The data processing apparatus may include a main processor 40, a memory 42, a storage 44, and a data transceiver 46. In addition, the data processing apparatus may further include an input interface device 48 allowing a user to input an operation command and an output interface device 50 providing the user with processing results. The components of the data processing apparatus may be connected by a bus to communicate with each other. In particular, according to an exemplary embodiment, the data processing apparatus may further include a cryptographic processor 90.

The main processor 40 may execute program instructions stored in the memory 42 and/or the storage 44. The main processor 40 may include a central processing unit (CPU) or a graphics processing unit (GPU), or may be implemented by another kind of dedicated processor suitable for performing the method of the present disclosure. The main processor 40 may execute program instructions for implementing general functions of a data processing apparatus and specific functions defined in the system shown in FIG. 2. In particular, according to an exemplary embodiment, the main processor 40 may instruct the cryptographic processor 90 to perform operations necessary for generating the post-quantum cryptography key or performing the post-quantum cryptography. The main processor 40 may receive operation results from the cryptographic processor 90. When instructing the cryptographic processor 90 to perform the operations, the main processor 40 may provide relevant instructions and one or more parameters to the cryptographic processor 90. The instructions may be machine codes prepared in advance, but the present disclosure is not limited thereto.

The memory 42 may include, for example, a volatile memory such as a read only memory (ROM) and a non-volatile memory such as a random access memory (RAM). The memory 42 may load the program instructions stored in the storage 44 to provide to the main processor 40 so that the main processor 40 may execute the program instructions. In particular, the memory 42 may store instructions and parameters necessary to control the cryptographic processor 90. In addition, the memory 42 may temporarily store data generated in the course of the operations of the main processor 40.

The storage 44 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The storage 44 may store program instructions for generating the quantum-secure encryption key and/or performing the quantum-secure encryption executed by the main processor 40 and/or the cryptographic processor 90. Such program instructions may be loaded into the main processor 40 and/or the cryptographic processor 90 through the memory 42 and executed.

The cryptographic processor 90, which may be a kind of an accelerator processor, may perform the post-quantum cryptographic protocol based on the instructions and one or more parameters received from the main processor 40. Here, the term 'post-quantum cryptographic protocol' used herein may refer to the generation of the quantum-secure encryption key, the encryption and decryption based on the public key, and another relevant data processing procedure such as the authentication using decrypted data. The authentication may include at least one of the authentication of a personal identification and a verification of data integrity. The cryptographic processor 90 may perform the whole operations of a task including the key generation, the encryption and/or decryption, and the authentication, but may perform only some of the operations of the task partially. In an exemplary embodiment, the partial operations may include modulo-additions, subtractions, and multiplications on matrices. The partial operations may further include sampling of each matrix shown in FIG. 1.

Figure 4:
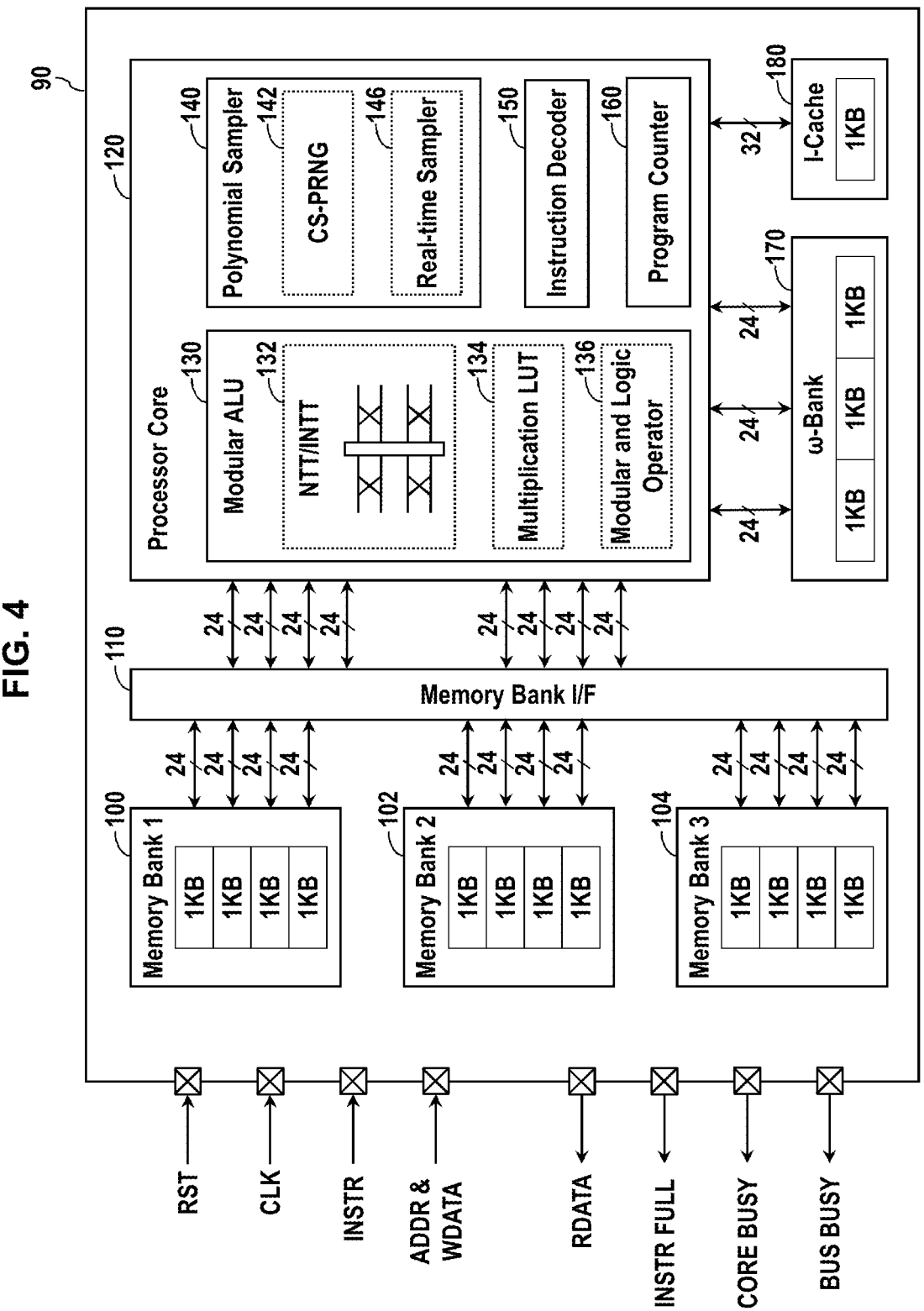
FIG. 4 is a block diagram of a cryptographic processor according to an exemplary embodiment of the present disclosure.

FIG. 4 is a block diagram of the cryptographic processor 90 according to an exemplary embodiment of the present disclosure. The cryptographic processor 90 according to present embodiment includes a first to third polynomial memory banks 100-104, a memory bank interface 110, a processor core 120, and a twiddle factor memory bank 170, and an instruction cache 180. The processor core 120 may include a modular arithmetic and logic unit (ALU) 130, a polynomial sampler 140, an instruction decoder 150, and a program counter 160. The cryptographic processor 90 may further include a memory interface (not shown) for accessing the memory 42 shown in FIG. 3.

The first to third polynomial memory banks 100-104 may store operands of matrix operations, i.e., polynomial coefficients for A, s, e, and b, and intermediate operation results. The polynomials coefficients represent elements of the polynomial vectors and may include sampled data generated by the polynomial sampler 140. According to an exemplary embodiment, the operands of the matrix operations, i.e., the polynomials coefficients for A, s, and e may be stored in one or two of the memory banks 100-104 and the intermediate operation results for each operation step or final operation results may be stored in the remaining memory bank. The memory bank interface 110 interfaces the first to third polynomial memory banks 100-104 with the processor core 120. In particular, the memory bank interface 110 may allow one or two of the first to third polynomial memory banks 100-104 to be connected to the processor core 120.

The ALU 130 may include an NTT/INTT operation circuit 132, a modular multiplication lookup table (LUT) 134, and a modular and logic operator 136. The NTT/INTT operation circuit 132 may perform a Number Theoretic Transform (NTT) operation and an Inverse NTT (INTT) operation at high speed. Detailed configuration and operation of the NTT/INTT operation circuit 132 will be described below with reference to FIGS. 6-9C. The modular multiplication LUT 134 stores modular operation values, for a particular modulus, binary numbers corresponding to digits having a value of 1 among the bit positions of an operand of a modular operation. When performing the modular multiplication of two numbers, the modular multiplication LUT 134 enables to find a general multiplication result of the two numbers and a modular operation value for the multiplication result. The data stored in the modular multiplication LUT 134 may be received from the main processor 40 and may be updated according to a change in the modulus. Although the modular multiplication LUT 134 may be used only for the modular multiplication in an exemplary embodiment, the modular multiplication LUT 134 may be used for modular addition and modular subtraction also as a whole or in part. Meanwhile, the modular and logic operator 136 may perform modular operations other than the NTT and INTT operations, e.g., modular addition, subtraction, and multiplication operations.

The polynomial sampler 140 may generate elements of the polynomial vector or matrix to be used in the lattice-based post-quantum cryptographic protocol by a uniform random sampling or a noise sampling. The polynomial sampler 140 may include a cryptographically secure pseudorandom number generator (CS-PRNG) 142 and a real-time sampler 146. The CS-PRNG 142 may generate cryptographically secure random numbers using a SHA-3 hash function. The real-time sampler 146 may sample and determine elements of the polynomial vectors A, s, and e according to the generated random numbers.

The instruction decoder 150 decodes instructions received from the main processor 40, and the instruction cache 180 stores instructions to be sequentially executed by the processor core 120. According to an exemplary embodiment, the instructions stored in the instruction cache 180 and executable by the processor core 120 may be implemented based on a unique instruction set designed by the inventors to be customized to the cryptographic processor 90. However, the present disclosure is not limited thereto, and instructions may be implemented based on a general-purpose instruction set. The program counter 160 may store and maintain an address of an instruction to be executed next among the instructions stored in the instruction cache 180.

The twiddle factor memory bank 170 stores twiddle factors needed for the NTT and INTT operations. Here, the twiddle factors refer to a primitive root (co) and its powers. The primitive root is an N-th root of 1 by modular arithmetic, that is, a value x that satisfies $x^N \equiv 1 \mod q$ for a prime number q. The twiddle factors may be derived from the primitive root, but it may take a long time to derive twiddle factors from the primitive root because an order N is generally large in the post-quantum cryptographic protocol and thus a large number of twiddle factors may exist. In an exemplary embodiment, the twiddle factors are stored in the twiddle factor memory bank 170 in advance to be used for the NTT and INTT operations. As will be described below, a butterfly circuit that performs the NTT operation or the INTT operation uses three twiddle factors as the operands at an arbitrary point in time. According to an exemplary embodiment, the twiddle factor memory bank 170 may include three banks, and each of the banks stores one type of twiddle factor. Thus, the twiddle factor memory bank 170 may provide the NTT/INTT operation circuit 132 with three types of twiddle factors in parallel.

Interface ports shown in FIG. 4 allow the cryptographic processor 90 to be interfaced to an external device such as the main processor 40 or memory 42 shown in FIG. 3. The interface ports may include input terminals such as a reset terminal (RST), clock terminal (CLK), an instruction terminal (INSTR), and an address and write data terminal (ADDR & WDATA). In addition, the interface ports may include output terminals such as a read terminal (RDATA), an instruction full indication terminal (INST FULL), a core busy indication terminal (CORE BUSY), and a bus busy indication terminal (BUS BUSY).

Figure 5:
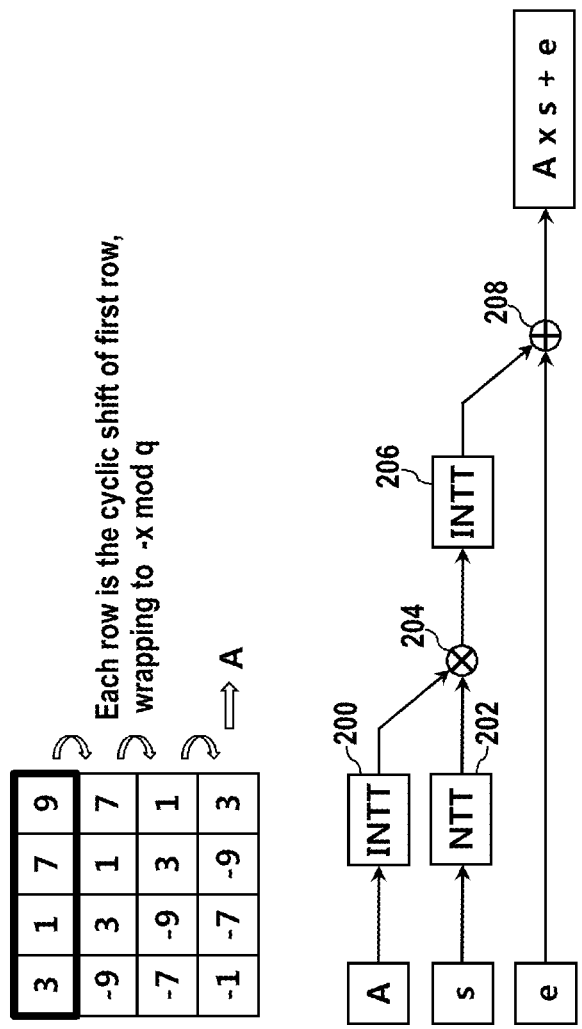
FIG. 5 illustrates a principle of a matrix multiplication in the RLWE-based encryption algorithm according to an exemplary embodiment of the present disclosure.

FIG. 5 illustrates a principle of a matrix multiplication in the RLWE-based encryption algorithm according to an exemplary embodiment of the present disclosure. In calculating the equation A×s+e on the left side of FIG. 1, performing the Number Theoretic Transform (NTT) on the two matrices A and s, multiplying transformed matrix, and then performing inverse NTT on a multiplication result NTT(A)×NTT(s) gives a same result as multiplying the two matrices A and s directly. Thus, an addition of the noise matrix e to the result of the inverse NTT (INTT) may result in the originally intended result A×s+e. In addition, the random matrix A may be determined by sampling only the elements of a single row as shown in the upper portion of FIG. 5 instead of obtaining all elements of the matrix by the uniform random sampling. In such a case, each of the remaining rows may be derived by cyclically shifting the elements of the previous row (for example, the first row in FIG. 5) and adding a minus sign (−) to a digit that is cyclically rotated to the other end.

In the matrix multiplier of FIG. 5, a first number theoretic transformer 200 performs the NTT operation on the random matrix A, and a second number theoretic transformer 202 performs the NTT operation on the secret matrix s. A multiplier 204 multiplies outputs of the first number theoretic transformer 200 and the second number theoretic transformer 202. An inverse number theoretic transformer 206 performs the inverse NTT operation on the output of the multiplier 204. The adder 208 adds the noise matrix e to an output of the inverse number theoretic transformer 206. Accordingly, an operation result A×s+e corresponding to the equation on the left side of FIG. 1 may be obtained, and it is possible to determine the matrix b from the operation result or determine whether the operation result is the same as the matrix b or not.

Figure 6:
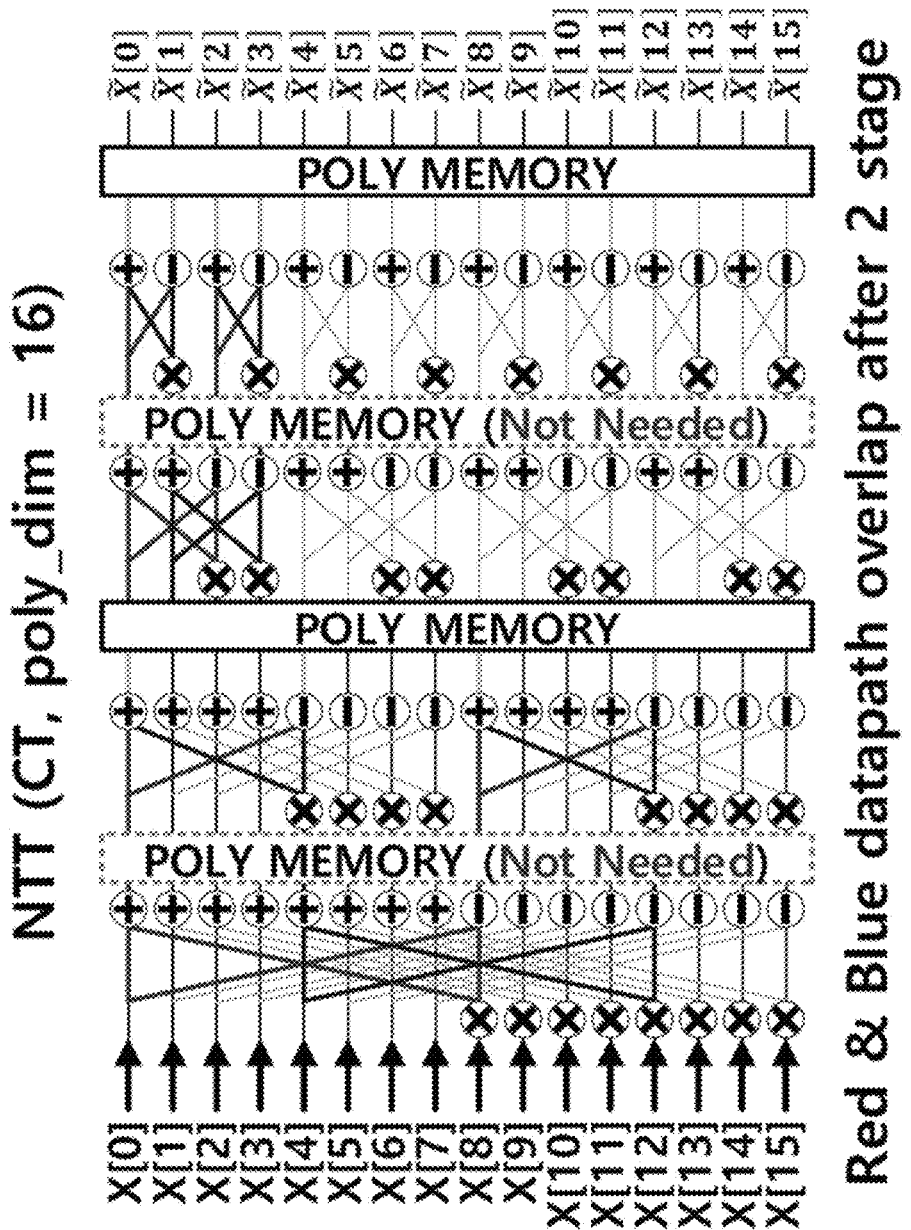
FIG. 6 is a signal flow graph of a 16-point NTT showing a regularity of a NTT operation.

FIG. 6 is a signal flow graph of a 16-point NTT showing a regularity of the NTT operation. To mathematically examine the regularity of the NTT operation, the NTT may be expressed by a following equation.

$$\tilde{X}(k) = \sum_{n=0}^{N-1} X(n) \cdot \omega^{nk} \mod p \quad \text{[Equation 1]}$$

Decimation of Equation 1 into even terms and odd terms based on Cooley-Tukey algorithm may result in Equation 2.

$$\tilde{X}(k) = \sum_{m=0}^{\frac{N}{2}-1} X(2m) \cdot \omega^{2mk} \mod p + \sum_{m=0}^{\frac{N}{2}-1} X(2m+1) \cdot \omega^{(2m+1)k} \mod p$$

$$= \sum_{m=0}^{\frac{N}{2}-1} X(2m) \cdot \omega^{2mk} \mod p + \omega^k \sum_{m=0}^{\frac{N}{2}-1} X(2m+1) \cdot \omega^{(2m+1)k} \mod p$$

$$= E_k + \omega^k O_k$$

$$\tilde{X}(k) = \sum_{m=0}^{\frac{N}{2}-1} X(2m) \cdot \omega^{2mk} \mod p + \sum_{m=0}^{\frac{N}{2}-1} X(2m+1) \cdot \omega^{(2m+1)k} \mod p$$

$$= \sum_{m=0}^{\frac{N}{2}-1} X(2m) \cdot \omega^{2mk} \mod p + \omega^k \sum_{m=0}^{\frac{N}{2}-1} X(2m+1) \cdot \omega^{2mk} \mod p$$

$$= E_k + \omega^k O_k$$

$$\tilde{X}(k) = \sum_{m=0}^{\frac{N}{2}-1} X(2m) \cdot \omega^{2mk} \mod p + \sum_{m=0}^{\frac{N}{2}-1} X(2m+1) \cdot \omega^{(2m+1)k} \mod p$$

$$= \sum_{m=0}^{\frac{N}{2}-1} X(2m) \cdot \omega^{2mk} \mod p + \omega^k \sum_{m=0}^{\frac{N}{2}-1} X(2m+1) \cdot \omega^{2mk} \mod p$$

$$= E_k + \omega^k O_k$$

Here, Ek denote NTT values for even-numbered inputs, and Ok denote NTT values for odd-numbered inputs. When a data length, i.e., the number of polynomial coefficients is N, Equation 2 holds for k=0, . . . , (N/2−1). Considering a periodicity, Equation 3 may be obtained for k=N/2, . . . , (N−1) similarly to Equation 2.

$$\tilde{X}\left(k + \frac{N}{2}\right) = E_k - \omega^k O_k \quad \text{[Equation 3]}$$

Equations 2 and 3 may be summarized to Equation 4.

$$\tilde{X}(k) = E_k + \omega^k O_k \tilde{X}\left(k + \frac{N}{2}\right) = E_k - \omega^k O_k \quad \text{[Equation 4]}$$

$$\tilde{X}(k) = E_k + \omega^k O_k \tilde{X}\left(k + \frac{N}{2}\right) = E_k - \omega^k O_k$$

That is, the NTT coefficients of the data of length N may be expressed by a sum or difference of the NTT coefficients of half-length data. In other words, a 2N-point NTT for 2N inputs may be reduced to about two 2N/2-point NTTs. Accordingly, the amount of operations may be reduced greatly, and the decrease in the amount of operations may be prominent as the data length N increases.

The NTT shown in FIG. 6 is a Radix-2 Decimation-in-time (DIT) transform based on the Cooley-Tukey algorithm and has a mathematical structure similar to that of the Fast Fourier Transform (FFT). The 2N-point NTT for 2N inputs may be performed over N stages, and the result of each stage must be stored in a memory since 2N operation results at each stage are used as inputs for the next stage. For example, a 16-point NTT may be performed over 4 stages, and the 16 operation results at each stage are stored in a polynomial memory bank to be provided as inputs to the next operation stage. However, memory write and read operations which may be performed in each stage take enormous amounts of time compared with the operations in the processor and may be a factor that greatly reduces a speed of the transform operation.

In the cryptographic processor 90 according to an exemplary embodiment, the NTT/INTT operation circuit 132 has an architecture capable of greatly reducing the number of memory accesses during the NTT and INTT operations to enhance the speed of the transform operation. The configuration and operation of the NTT/INTT operation circuit 132 for reducing the number of memory accesses during the NTT and INTT operations will now be described with reference to FIGS. 7A-8D.

In the NTT shown in FIG. 6, output indices have the same order as input indices over the entire transform operation as well as in each operation stage. In addition, the output coefficients of each operation stage are influenced only by the two input coefficients. Such a regularity generally provides a clue to a butterfly structure or the NTT operation circuit similarly to a conventional FFT. In an exemplary embodiment of the present disclosure, a circuit that performs two-stage operations on four inputs is configured by grouping four butterfly structures into a single circuit. The circuit configured by grouping the four butterfly structures and performing two-stage operations on four inputs will be referred to as a combined butterfly circuit in this specification.

For example, when 16 inputs of X[0]-X[15] are applied to the circuit as shown in FIG. 6, four input coefficients X[0], X[4], X[8], X[12] associated with the butterfly structures indicated by thick lines are operands that are not affected by the other input coefficients and do not affect operations of the other input coefficients. Also, after two stage operations, the output coefficients having the same indices as the input coefficients mentioned above are output at the same positions as the four input coefficients, that is, at zero-th, fourth, eighth, and twelfth taps. In other words, the combined butterfly circuit in an exemplary embodiment may receive the four input coefficients X[0], X[4], X[8], and X[12], perform two-stage operations consecutively, and output the operation results in the same index and order as the input coefficients X[0], X[4], X[8], and X[12].

Similarly, the combined butterfly circuit may receive another four input coefficients X[1], X[5], X[9], and X[13], perform two-stage operations consecutively, and output the operation results in the same index and order as the input coefficients X[1], X[5], X[9], and X[13]. The combined butterfly circuit may receive another four input coefficients X[2], X[6], X[10], and X[14], perform two-stage operations consecutively, and output the operation results in the same index and order as the input coefficients X[2], X[6], X[10], and X[14]. The combined butterfly circuit may receive another four input coefficients X[3], X[7], X[11], and X[15], perform two-stage operations consecutively, and output the operation results in the same index and order as the input coefficients X[3], X[7], X[11], and X[15].

The combined butterfly circuit may also perform the operations of stages 3 and 4 shown in FIG. 6. For example, the combined butterfly circuit may perform operations corresponding to the butterfly structures indicated by thick lines in the stages 3 and 4 of FIG. 6. Further, the combined butterfly circuit may similarly perform the remaining third and fourth stage operations in FIG. 6.

Figure 7A:
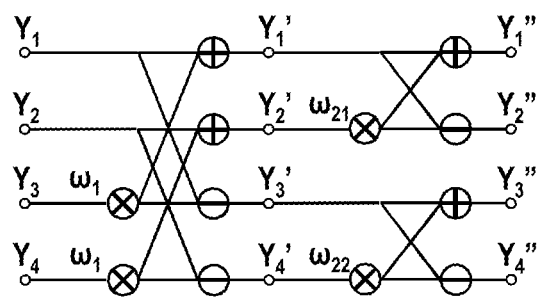
FIG. 7A illustrates an exemplary embodiment of a combined NTT butterfly structure configured by a segmentation according to Cooley-Tukey algorithm.

FIG. 7A shows an exemplary embodiment of a combined NTT butterfly structure configured by a segmentation according to the Cooley-Tukey algorithm. The combined NTT butterfly structure shown in the drawing may be understood as a segmentation of the NTT operation circuit of FIG. 6. However, the combined NTT butterfly structure may also be an independent 22-point NTT operation circuit having 22 inputs and 22 outputs. The combined NTT butterfly structure of FIG. 7A may include four multipliers, four adders, and four subtractors. The operation results of the combined NTT butterfly structure may be expressed by Equations 5 and 6.

$$Y_1' = Y_1 + \omega_1 Y_3 Y_2' = Y_2 + \omega_1 Y_4$$

$$Y_1' = Y_1 + \omega_1 Y_3 Y_2' = Y_2 + \omega_1 Y_4$$

$$Y_3' = Y_1 - \omega_1 Y_3 Y_4' = Y_2 - \omega_1 Y_4$$

$$Y_3' = Y_1 - \omega_1 Y_3 Y_4' = Y_2 - \omega_1 Y_4 \quad \text{[Equation 5]}$$

$$Y_1'' = Y_1' + \omega_{21} Y_2' Y_2'' = Y_1' - \omega_{21} Y_1'$$

$$Y_1'' = Y_1' + \omega_{21} Y_2' Y_2'' = Y_1' - \omega_{21} Y_1'$$

$$Y_3'' = Y_3' + \omega_{22} Y_4' Y_3'' = Y_3' - \omega_{22} Y_4'$$

$$Y_3'' = Y_3' + \omega_{22} Y_4' Y_3'' = Y_3' - \omega_{22} Y_4' \quad \text{[Equation 6]}$$

Figure 7B:
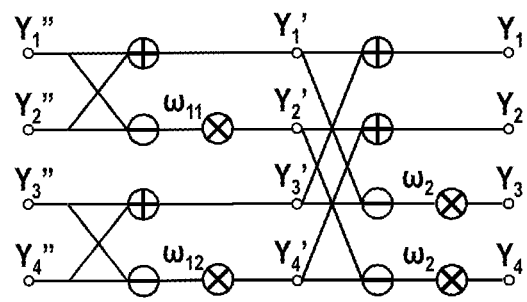
FIG. 7B illustrates an exemplary embodiment of a combined INTT butterfly structure configured by a segmentation according to Gentleman-Sande algorithm.

The INTT may also be described in a manner similar to the NTT shown in FIGS. 6 and 7A. FIG. 7B illustrates an exemplary embodiment of a combined INTT butterfly structure in which an INTT operation circuit is segmented in a decimation-in-time scheme. The combined INTT butterfly structure shown in the drawing is implemented according to the Gentleman-Sande (GS) algorithm and may be used in correspondence with the combined NTT butterfly structure of FIG. 7A. The combined INTT butterfly structure of FIG. 7B may include four adders, four subtractors, and four multipliers. The operation results of the combined INTT butterfly structure may be expressed by Equations 7 and 8.

$$Y_1' = Y_1'' + Y_2'' Y_2' = \omega_{11}(Y_2'' - Y_1'') Y_3' = Y_3'' + Y_4'' Y_4' = \omega_{12}(Y_4' - Y_3'')$$

$$Y_1' = Y_1'' + Y_2'' Y_2' = \omega_{11}(Y_2'' - Y_1'') Y_3' = Y_3'' + Y_4'' Y_4' = \omega_{12}(Y_4' - Y_3'')$$

$$Y_1' = Y_1'' + Y_2'' Y_2' = \omega_{11}(Y_2'' - Y_1'') Y_3' = Y_3'' + Y_4'' Y_4' = \omega_{12}(Y_4' - Y_3'')$$

$$Y_1' = Y_1'' + Y_2'' Y_2' = \omega_{11}(Y_2'' - Y_1'') Y_3' = Y_3'' + Y_4'' Y_4' = \omega_{12}(Y_4' - Y_3'') \quad \text{[Equation 7]}$$

$$Y_1 = Y_1' + Y_3' Y_2 = Y_2' + Y_4' Y_3 = \omega_2(Y_3' - Y_1') Y_4 = \omega_2(Y_4' - Y_2')$$

$$Y_1 = Y_1' + Y_3' Y_2 = Y_2' + Y_4' Y_3 = \omega_2(Y_3' - Y_1') Y_4 = \omega_2(Y_4' - Y_2')$$

$$Y_1 = Y_1' + Y_3' Y_2 = Y_2' + Y_4' Y_3 = \omega_2(Y_3' - Y_1') Y_4 = \omega_2(Y_4' - Y_2')$$

$$Y_1 = Y_1' + Y_3' Y_2 = Y_2' + Y_4' Y_3 = \omega_2(Y_3' - Y_1') Y_4 = \omega_2(Y_4' - Y_2') \quad \text{[Equation 8]}$$

In the combined NTT butterfly structure of FIG. 7A and the combined INTT butterfly structure of FIG. 7B, only three twiddle factors $\omega_i$ and $\omega_{ij}$ are required during the two stage operations and the twiddle factors may be derived from the primitive root. According to an exemplary embodiment, however, the twiddle factors stored in the twiddle factor memory bank 170 are used instead of being derived from the primitive root to reduce the operation time.

The combined butterfly structures of FIGS. 7A and 7B enables to consecutively perform two stage NTT or INTT operations without a memory access during the operation. In other words, it is not necessary to store the operation result in the memory after the operation of the first stage, and it is sufficient to store the operation result in the memory only after the operation of the second stage is completed. Generally, the NTT or INTT operation may be performed in 4 stages each of which requires reading data stored in the memory and writing data into the memory, and thus data reading and writing may be performed four times during the four stage operations. According to an exemplary embodiment of the present disclosure, however, a single data reading and a single data writing are required while two stage operations are performed consecutively, and thus data reading and writing may be performed only twice during the four stage operations. Accordingly, the number of memory access during the NTT or INTT operation is reduced by a half, which may enhance the speed of the NTT and INTT operations and may also reduce the energy consumption required for the NTT or INTT operation.

Figure 8:
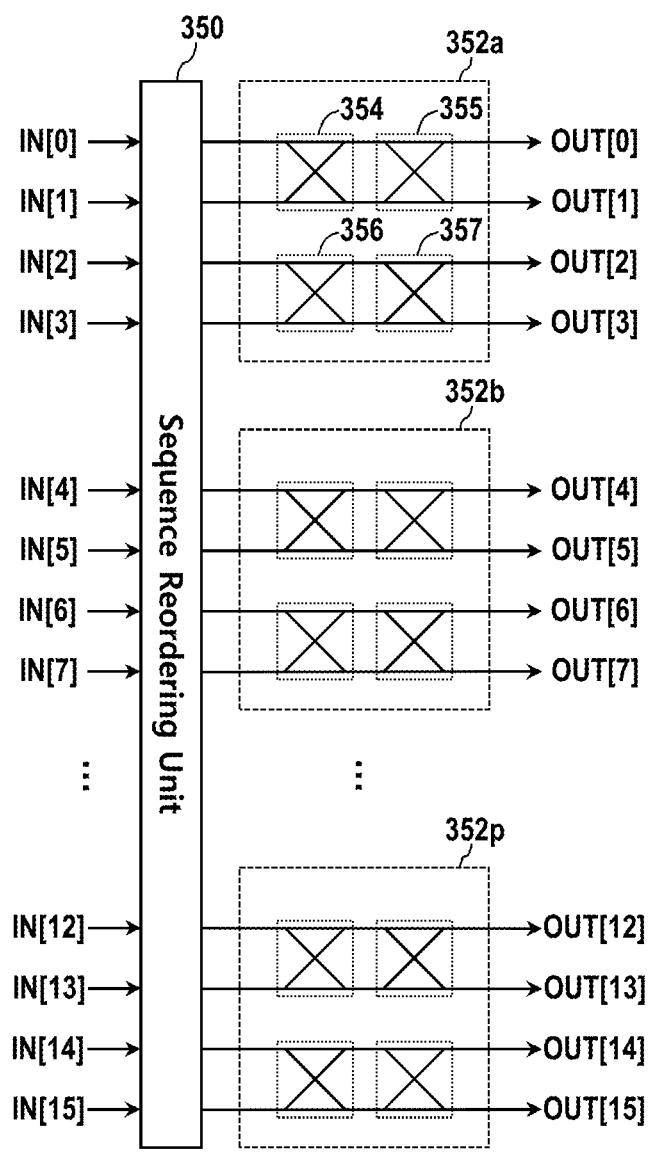
FIG. 8 is a block diagram of an exemplary embodiment of an NTT/INTT operation circuit shown in FIG. 4.

FIG. 8 is a block diagram of an exemplary embodiment of the NTT/INTT operation circuit 132 shown in FIG. 4. The NTT/INTT operation circuit 132, which integrates an NTT operation circuit based on the Cooley-Tukey algorithm and an INTT operation circuit based on the Gentleman-Sende algorithm, may selectively perform the NTT or INTT operation. The NTT/INTT operation circuit 132 may receive input data IN[0]-IN[15] from the memory banks 100-104 and perform operations for the NTT or INTT to output an operation results OUT[0]-OUT[15] to the memory banks 100-104. In the case of performing the NTT operation, the input data IN[0]-IN[15] may represent polynomial coefficients before the transform, and the operation results OUT[0]-OUT[15] may represent NTT transform coefficients. In the case of performing the INTT operation, the input data IN[0]-IN[15] may represent the NTT transform coefficients, and the operation results OUT[0]-OUT[15] may represent inverse transform coefficients, i.e., the polynomial coefficients before the transform. The circuit shown in the drawing, which may perform the two stage operations on 16 input coefficients during the NTT or INTT process, may complete the 16-point NTT or INTT by repeating two times to read data from the memory banks 100, 102, or 104, perform the arithmetic operations, and write data into the memory bank 100, 102, or 104. Alternatively, however, a complete NTT/INTT operation circuit 132 may be implemented by connecting two circuits of FIG. 8 in series.

The NTT/INTT operation circuit 132 according to an exemplary embodiment may include a sequence reordering unit 350 rearranging a sequence of the input coefficients and a plurality of combined butterfly units 352A-352P performing the operations of two stage for NTT or INTT in parallel for the coefficients rearranged by the sequence reordering unit 350. A selection of the NTT or INTT may be determined by a mode control signal CT, which will be described in detail below. Each of the plurality of combined butterfly units 352A-352P may include four NTT/INTT operation cells 354-357, which may have the same structure as each other but may receive input data a, b, and ω different from one another.

Figure 9A:
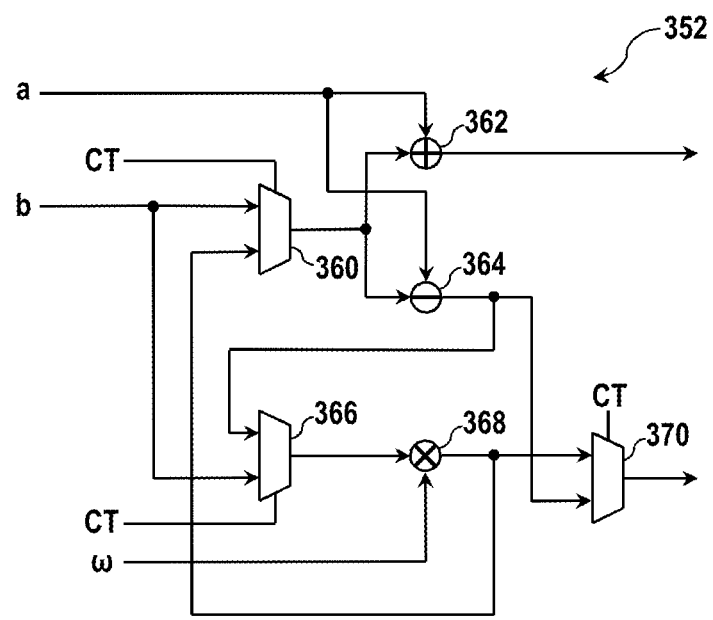
FIG. 9A is a circuit diagram of one of NTT/INTT operation cells shown in FIG. 8.

FIG. 9A is a circuit diagram of one of the NTT/INTT operation cells 354-357 shown in FIG. 8. The NTT/INTT operation cell 354 may include a first selector 360, an adder 362, a subtractor 364, a second selector 366, a multiplier 368, and a third selector 370. All of the first to third selectors 360, 366, and 370 have two input terminals and additionally have a mode control signal input terminal. Each of the first to third selectors 360, 366, and 370 may selectively output one of signals input to its first and second input terminals according to the mode control signal CT.

The first selector 360 may receive a data input 'b' through its first input terminal and an output of the multiplier 370 through its second input terminal to select one of the two input signals. The adder 362 may add an output of the first selector 360 to a data input 'a' to output an addition result as a first output signal of the NTT/INTT operation cell 354. The subtractor 364 may subtract the output of first selector 360 from the data input 'a'. A second selector 366 may receive an output of the subtractor 364 through its first input terminal and the data input 'b' through its second input terminal to select one of the two input signals. The multiplier 368 may multiply an output of the second selector 366 by the twiddle factor co. The third selector 370 may receive the output of the multiplier 368 through its first input terminal and the output of the subtractor 364 through its second input terminal to select one of the two input signals and output a selected signal as a second output signal of the NTT/INTT operation cell 354.

Figure 9B:
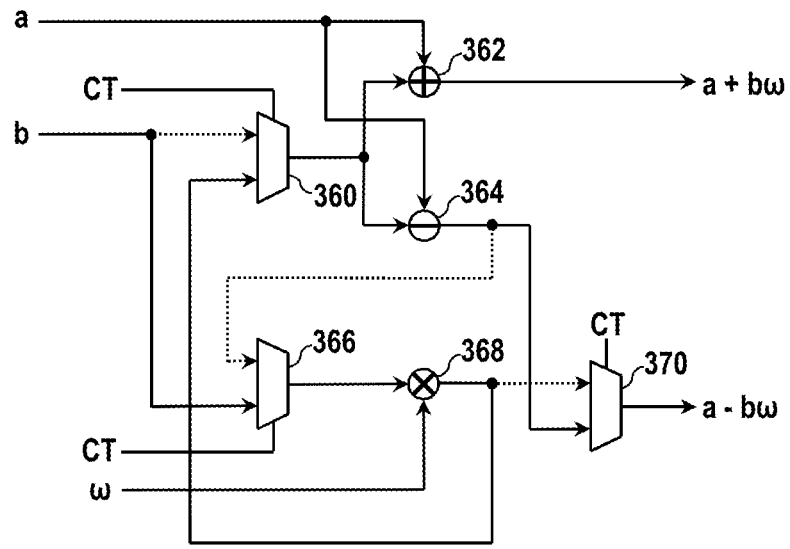
FIG. 9B illustrates an operation of the NTT/INTT operation cell of FIG. 9A in case of performing an NTT operation.

Referring to FIG. 9B, when the level of the mode control signal CT is 1, the NTT/INTT operation cell 354 operates as a butterfly circuit for a single-stage NTT according to the Cooley-Tukey (CT) algorithm. In this case, the first selector 360 selects the output of the multiplier 370 received through its second input terminal, and the second selector 366 selects the data input 'b' received through its second input terminal. As a result, the multiplier 368 multiplies the data input 'b' by the twiddle factor w and outputs the multiplication result bω. Accordingly, the adder 362 outputs the addition result (a+bω), and the third selector 370 outputs the output (a−bω) of the subtracter 364 received through its second input terminal.

Figure 9C:
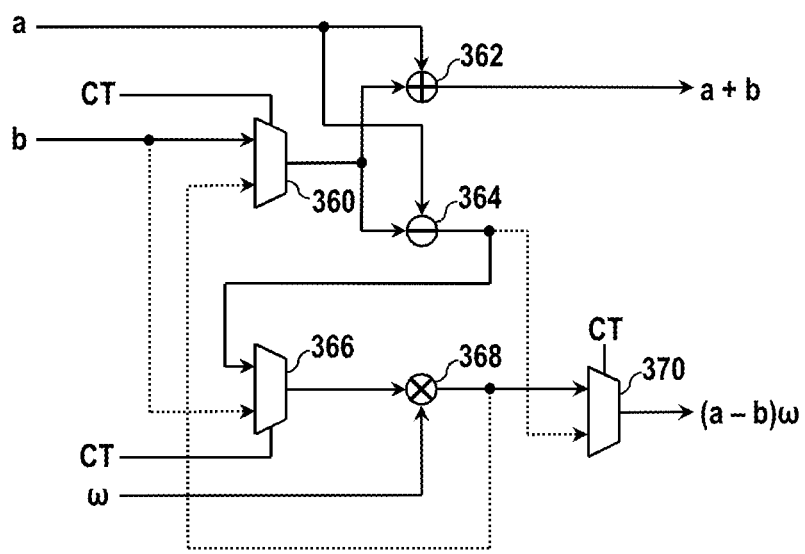
FIG. 9C illustrates an operation of the NTT/INTT operation cell of FIG. 9A in case of performing an INTT operation.

Referring to FIG. 9C, when the level of the mode control signal CT is 0, the NTT/INTT operation cell 354 operates as a butterfly circuit for a single-stage INTT according to the Gentleman-Sande (GS) algorithm. In this case, the first selector 360 selects the data input 'b' received through its first input terminal, and the second selector 366 selects the output of the subtractor 364 received through its second input terminal. As a result, the subtractor 364 outputs the subtraction result (a−b), and the multiplier 368 multiplies the output (a−b) of the subtractor 364 by the twiddle factor w to output the multiplication result (a−b)ω. Accordingly, the adder 362 outputs the addition result (a+b), and the third selector 370 outputs the output (a−b)ω of the multiplier 368 received through its first input terminal.

As described above, according to an exemplary embodiment, the sequence reordering unit 350 and the combined butterfly circuit are provided for each two operation stages, so that the data sequence is rearranged and the NTT or INTT operations of two consecutive stages are performed for the rearranged data sequence without intermediate access of the memory bank. As a result, the time required for the NTT and INTT operations may be reduced greatly. The inventors of the disclosure found a unique interconnection between four input sets and four output sets in the NTT and INTT signal flow graph and designed the combined butterfly circuit based on the discovery. According to an exemplary embodiment of the present disclosure, the NTT/INTT operation circuit 132 may include a plurality of combined butterfly circuits and perform the operations of two stages in one cycle by a 4-to-4 bijection structure. Since each 4-to-4 bijection unit is computationally separate from the other bijection units, any memory access for a temporary storage and retrieval of data is not required. Any bijection mapping may be defined through the sequence reordering by the sequence reordering unit 350, which may be implemented by a multiplexer, for example.

Meanwhile, each of the lattice-based post-quantum cryptographic algorithms uses a unique prime number as a modulus to perform modular arithmetic operations. As the size of an operand increases, the modular operations may consume more clock cycles and require larger hardware. In particular, a modular multiplication consumes lots of clock cycles because a multiplication operation itself consumes many clock cycles and increases a number of bits of a multiplication result value compared with the numbers before the multiplication operation. Therefore, the modular multiplication may be a largest load in the NTT operation and may be a principal bottleneck causing a delay in the operation. To reduce the number of clock cycles required for the modular multiplication, the modular and logic operator 136 in the cryptographic processor 90 of FIG. 4 may perform the modular multiplication using the modular multiplication LUT 134.

FIG. 10 is a circuit diagram of a modular multiplication circuit according to an exemplary embodiment of the present disclosure. The modular multiplication circuit of FIG. 10 includes a multiplier 400, a first compressor 410, a first adder 420, a second compressor 430, and a second adder 440. The multiplier 400 may receive two input data Dint and D in2 to perform a multiplication of the two input data. The first compressor 410 and the first adder 420 may perform a modular operation on an output of the multiplier 400 to output a first modular operation result D'. The second compressor 430 and the second adder 440 may perform a modular operation on an output of the first adder 420 to output a final modular operation result Dout. The second compressor 430 may have a structure similar to that of the first compressor 410 but may have a smaller size than the first compressor 410.

It is assumed that the lattice-based post-quantum cryptographic algorithm is performed using a prime number q as the modulus. When the two input data Dint and Din2 for the modular multiplication are 24-digit binary numbers, for example, the multiplication result D output by the multiplier 400 may be a binary number of up to 48 bits. The modular multiplication LUT 134 may store a modulo-q value for each binary number corresponding to a digit having a value of 1 among the bit positions of the operand of the modular operation, i.e., the multiplication result D. The first compressor 410 may read out, from the modular multiplication LUT 134, the modular operation result value for each of the digits having the value of 1 among the digits of the multiplication result D while ignoring the digits having a value of 0 in the multiplication result D. At this time, assuming that the modulus q is a k-bit number, the modular operation is significantly unnecessary for the least significant k bits, and thus the reading out of the modular-q values from the modular multiplication LUT 134 for those bits may be omitted. The first adder 420 may calculate a first modular operation result D' by adding the modular-q values read out from the modular multiplication LUT 134 and the lower k bits of the multiplication result D.

Since the first modular operation result D' output by the first adder 420 may be greater than the modulus q, the second compressor 430 and the second adder 440 may perform another modular operation on the first modular operation result D'. That is, the second compressor 430 may read out, from the modular multiplication LUT 134, the modular operation result value for each of the digits having the value of 1 among the digits of the first modular operation result D' while ignoring the digits having a value of 0 in the first modular operation result D'. Assuming that the modulus q is a k-bit number as above, the modular operation may be unnecessary for the least significant k bits, and thus the reading out of the modular-q values from the modular multiplication LUT 134 for those bits may be omitted. In addition, the modular-q values may be unnecessary for the digits of the first modular operation result D' which do not affect on the final modular operation result Dout, e.g., bit positions higher than least significant (k+4)-th bit positions, and thus the reading out of the modular-q values from the modular multiplication LUT 134 for those bits may be omitted. The second adder 440 may calculate the final modular operation result Dout by adding the modular-q values read out from the modular multiplication LUT 134.

For example, assuming that the multiplication result D output by the multiplier 400 is '1011011(2) mod 7', the modular operation may be decomposed to '26 mod 7', 0, '24 mod 7', '23 mod 7', and '011(2) mod 7' as shown at the bottom of FIG. 10. The first compressor 410 may read out modular operation results for '26 mod 7', 0, '24 mod 7', and '23 mod 7' from the modular multiplication LUT 134, and the first adder 420 may add the modular operation results. At this time, since the modulus is 7 which is a 3-digit binary number, the adder 420 may omit obtaining the modulus operation result using the modular multiplication LUT 134 for the three bits of the multiplication result D and directly add corresponding bits of the multiplication result D to the modulus operation results for the other bit positions.

As described above, according to an exemplary embodiment, the modular multiplication circuit of the modular and logic operator 136 is equipped with two-stage modulo-q compressors, which may effectively decrease clock cycles required for the operation and reduce a number of bits involved in the operation during the modular multiplication operation so that the modular multiplication may be performed with a minimal latency. In the example above, the modular multiplication using the LUT 134 may be applicable to any integer q which is smaller than $2^{24}$.

The numbers stored in the modular multiplication LUT 134 may be prepared by the instructions from the main processor 40 and may be changed by the instructions from the main processor 40 when the algorithm to be processed is changed, for example. Also, the data stored in the modular multiplication LUT 134 may be updated when the modulus is changed for the same algorithm. Therefore, the modular multiplication may be performed for an arbitrary modulus by using the modular multiplication LUT 134. The modular multiplication may be performed speedily while maintaining a hardware size small. Although the circuit of FIG. 10 is suitable for performing the modular multiplication, such an arithmetic circuit is applicable generally to all kinds of modular arithmetic operations except for the multiplier 400.

Figure 11:
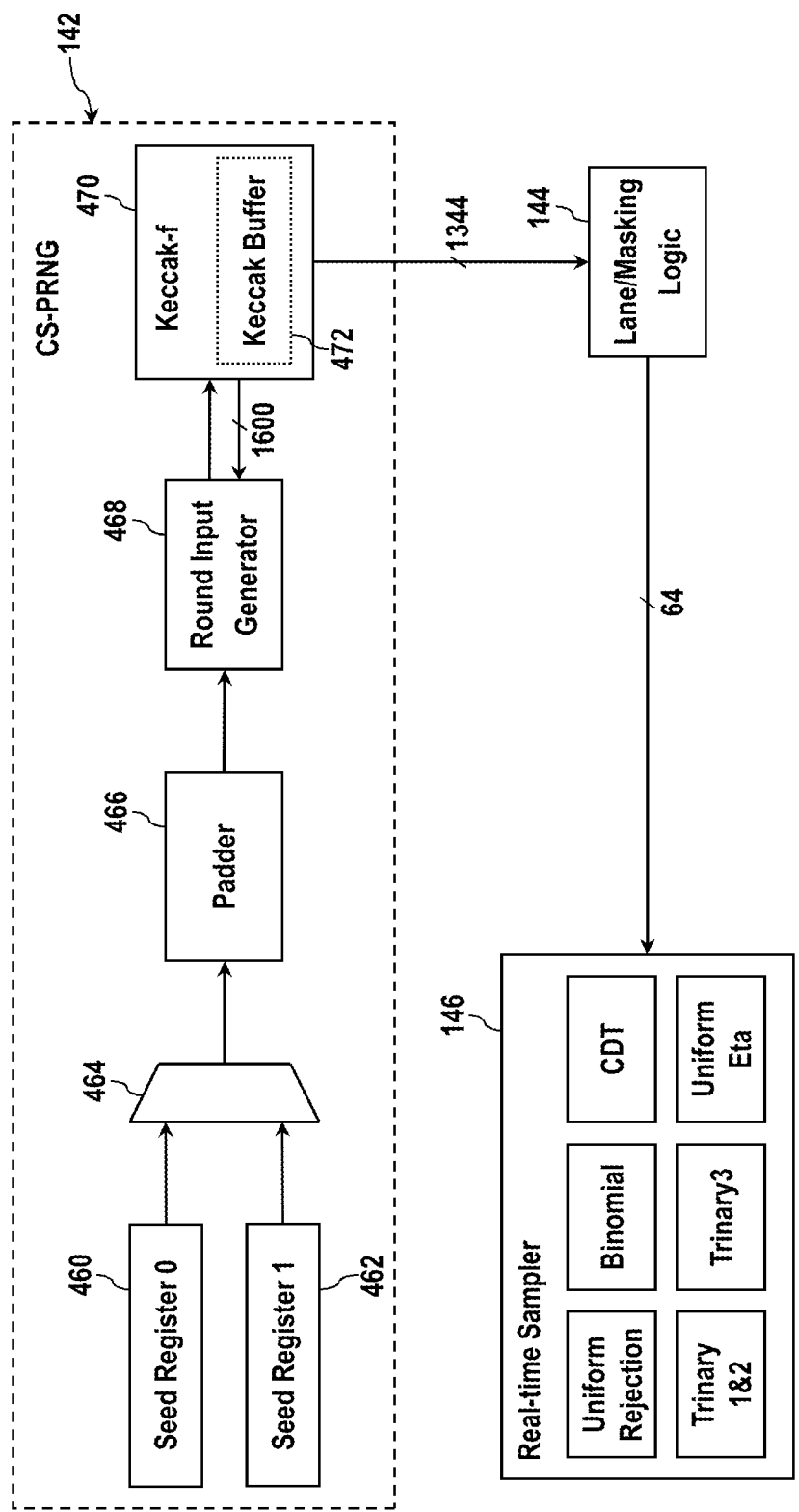
FIG. 11 is a circuit diagram of a polynomial sampler according to an exemplary embodiment of the present disclosure.

FIG. 11 is a circuit diagram of the polynomial sampler 140 according to an exemplary embodiment of the present disclosure. The polynomial sampler 140 may generate pseudonoise in real time and generate elements of polynomial vectors or matrices to be used in the lattice-based post-quantum cryptographic protocol by a uniform random sampling or a noise sampling. The polynomial sampler 140 may include a cryptographically secure pseudorandom number generator (CS-PRNG) 142, a lane/mask logic 144, and a real-time sampler 146.

The CS-PRNG 142 may include first and second seed registers 460 and 462, a multiplexer 464, a padder 466, a round input generator 468, and a Keccak core 470.

The first and second seed registers 460 and 462 may output pseudo noises to be used as seed data which are entropy sources. The seed data stored in the first and second seed registers 460 and 462 may be received from the main processor 40. The multiplexer 464 may select and output one of the seed data provided by the first and second seed registers 460 and 462. The padder 466 may receive the seed data from the first or second seed register 460 or 462 through the multiplexer 464 and maintain the length of the seed data uniformly by zero-padding, for example. The round input generator 468 may receive padded data from the padder 466 and output a new round constant for each sampling round.

The Keccak core 470 may generate a random number using a SHA-3 hash function formulated based on a Keccak-f algorithm. Considering that an execution of the SHA-3 hash function is a very complex operation and may consume many clock cycles during a random number generation process, the random number generation using the SHA-3 hash function may be performed by the cryptographic processor 90 which is an accelerator processor rather than rather than the main processor 40 which is a general-purpose processor. The Keccak core 470 may internally include a Keccak buffer 472 capable of storing a hash value calculated by the hash function. The Keccak core 470 may generate the random number by executing the hash function in real time and provide the random number to the real-time sampler 146 through the lane/mask logic 144 while buffering the random number by the Keccak buffer 472.

The lane/mask logic 144 may adjust a number of bit lanes through which the random numbers are supplied to the real-time sampler 146. The number of bit lanes may vary according to a sampling algorithm selected and used in the real-time sampler 146. In case that a length of the random number is different from a length of the word in the sampling protocol, the lane/mask logic 144 may mask the random number by truncating truncates bits at a predetermined bit position of the random number using a bit mask to prevent a waste of power.

The real-time sampler 146 may sample the elements of the polynomial vectors A, s, and e from a Gaussian distribution or a discrete distribution such as a binomial distribution by using the random numbers received from the CS-PRNG 142 through the lane/mask logic 144. The real-time sampler 146 may include multiple types of samplers. The sampler types may include at least some of the samplers including a uniform rejection sampler, a binomial sampler, a cumulative distribution table (CDT)-based sampler, a Trinary 1 and 2 sampler, a Trinary 3 sampler, a uniform eta sampler. According to an exemplary embodiment, these samplers may be implemented by hardware in the cryptographic processor 90.

Here, the secret vector s and the error vector e may be sampled by the same sampler from the same distribution. For example, the secret vector s and the error vector e may be sampled, by a common uniform rejection sampler, in a noise sampling method in which a size of each element is restricted to have a small value. The public matrix A may be uniformly random sampled by a uniform eta sampler. Meanwhile, as mentioned above, just a single row or column of the public matrix A may be sampled, and the remaining rows or columns may be determined by shifting the sampled row or column.

The polynomial vectors A, s, and e of which elements have been sampled by the real-time sampler 146 may be stored in the polynomial memory banks 100-104 to be used for the operation of the NTT, the key generation, or the encryption of data.

It is known that algorithms based on the LWE problem rely on statistical properties of the polynomial sampling which takes about 70% of computations. Therefore, the design of sampling hardware significantly affect the processing speed of the algorithm and an energy performance. According to an exemplary embodiment, the sampling may be performed by the CS-PRNG 142 and the post-processing real-time sampler 146. The CS-PRNG 142 may compute SHA-3 functions using a 1600-bit Keccak-f core which supports various SHA-3 modes. The processing for the CS-PRNG 142 may take 24 cycles and generate 1344-bit or 1088-bit outputs in case of SHAKE-128 or SHAKE-256, respectively. The Keccak buffer 472 is used to store the previous 1344b or 1088b so that the Keccak core 470 may work for the next output. Accordingly, the Keccak-f core 470 may be utilized continuously. The contents of the Keccak buffer 472 may be flushed to the real-time sampler 146 through a 64-bit channel (4×16 bits or 2×32 bits). The real-time sampler 146 equipped with a plurality of modular samplers as described above may support a variety of distributions to be performed through a number of modular subtractions.

Figure 12:
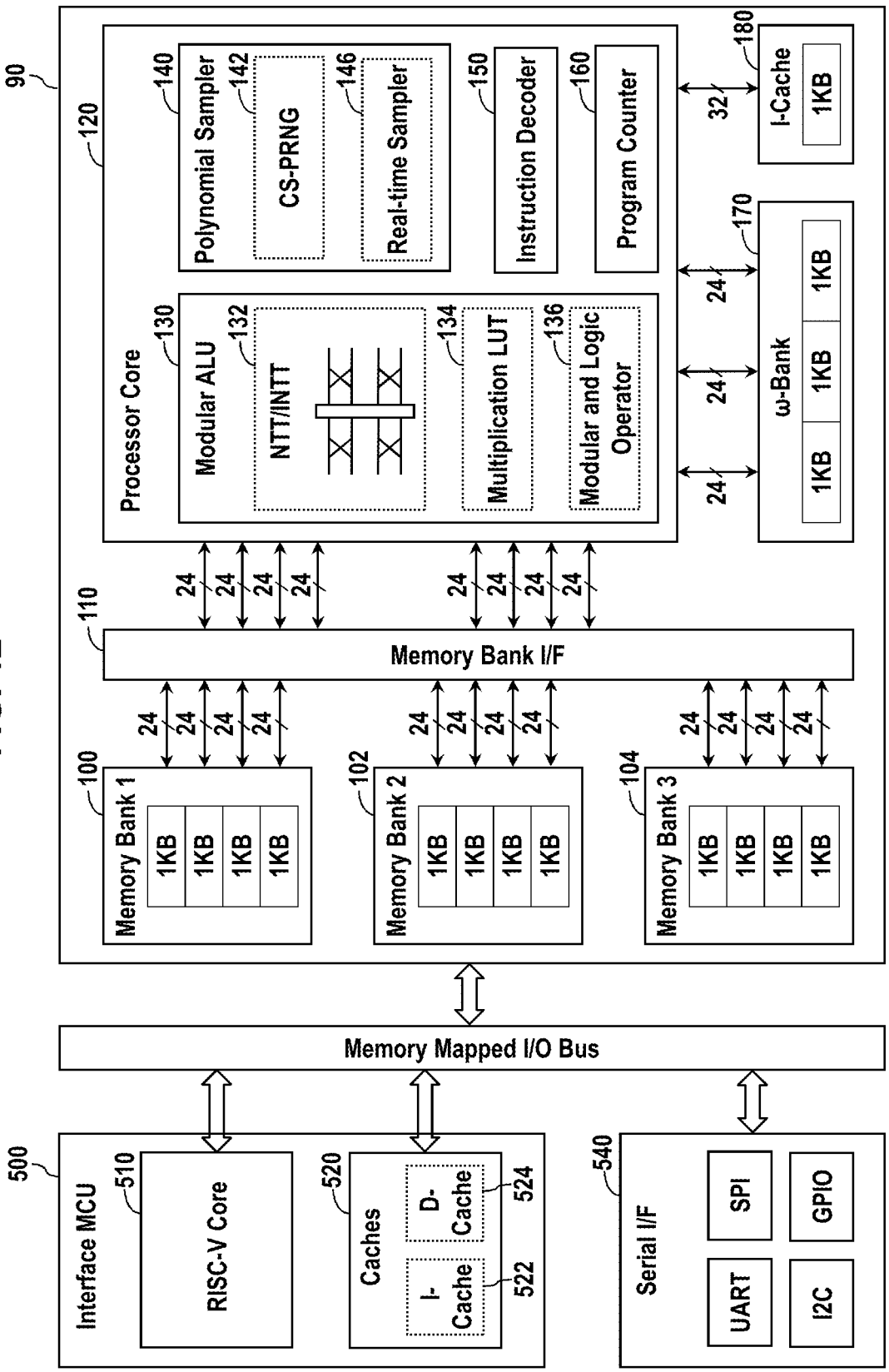
FIG. 12 is a block diagram of a cryptographic processor according to another exemplary embodiment of the present disclosure.

FIG. 12 is a block diagram of the cryptographic processor 90 according to another exemplary embodiment of the present disclosure. The cryptographic processor 90 according to the present embodiment may include the first to third polynomial memory banks 100-104, the memory bank interface 110, the processor core 120, and the twiddle factor memory bank 170, and an instruction cache 180. The first to third polynomial memory banks 100-104, the memory bank interface 110, the processor core 120, the twiddle factor memory bank 170, and the instruction cache 180 may be the same as or similar to the corresponding members in the embodiment shown in FIG. 4. Meanwhile, an integrated circuit (IC) chip implementing the cryptographic processor 90 may further include an interface microcontroller unit (MCU) 500 and a serial interface 540. The interface MCU 500 and the serial interface 540 may be interfaced to the cryptographic processor 90 in a memory-mapped I/O scheme, that is, in a manner that memory addresses are allocated in the same manner as in a normal memory space.

The cryptographic processor 90 according to the present embodiment may be an accelerator processor operating as a slave device of the main processor 40 as shown in FIGS. 3 and 4, but may also act as a general-purpose processor with enhanced cryptographic algorithm processing functions.

The interface MCU 500 operates based on a program and controls the operation of the cryptographic processor 90. The interface MCU 500 may include a processor core 510 and a cache memory 520. The processor core 510 may be implemented by a RISC-V core, for example. In this case, the processor core 510 may execute the instructions stored in the cache memory 520 according to a RISC pipeline including Instruction Fetch (IF), Instruction Decode (ID), Execute (EX), Memory access (MEM), and Register write back (WB). The cache memory 520 may include an instruction cache 522 and a data cache 524. The instruction cache 522 stores instructions to drive the interface MCU 500. The instructions stored in the instruction cache 522 may be implemented based on a predetermined reduced instruction set. The data cache 524 stores data necessary for the operation of the interface MCU 500. In particular, the data stored in the data cache 524 may include instructions necessary for operating the cryptographic processor 90.

The serial interface 540 enables the cryptographic processor 90 to serially interface with the main processor 40 or an external device. The serial interface 540 may include circuits and ports for a Universal Asynchronous Receiver and Transmitter (UART) interface, a Serial Peripheral Interface (SPI) interface, an Inter-Integrated Circuits (I2C) communications interface, and a general-purpose input and output (GPIO) interface.

When it is necessary to execute the encryption algorithm, instructions for driving the processor core 510 of the interface MCU 500 may be received from the main processor 40 or a separate external device (not shown) by the interface MCU 500 and stored in the instruction cache 522. The instructions may be provided to the interface MCU 500 directly or through an input and output (I/O) device interfaced with the interface MCU 500. The processor core 510 of the interface MCU 500 may control the cryptographic processor 90 according to the instructions stored in the instruction cache 522, so that the encryption algorithm is executed.

Meanwhile, the instructions to be executed by the processor core 120 of the cryptographic processor 90 may be transferred to the instruction cache 180 of the cryptographic processor 90 in one of following two ways. First, instruction data may be written directly to the instruction cache 180 of the cryptographic processor 90 from outside the chip, i.e., from the main processor 40 or a separate external device, through the serial interface 540 of the interface MCU 500, e.g., the GPIO, or through an I/O device interfaced to the interface MCU 500. Second, the instruction data may be written in to the data cache 524 of the interface MCU 500 from the outside the chip, so that the processor core 510 of the interface MCU 500 delivers the instruction data to the instruction cache 180 of the cryptographic processor 90.

Features of each embodiment described above may be adopted and utilized in another embodiment even if not depicted in the drawings or described herein. In particular, the configurations described with reference to FIG. 4 may be adopted and applied to the embodiment of FIG. 12, and the configurations described with reference to FIG. 12 may also be adopted and applied to the embodiment of FIG. 4.

A cryptographic processor according to the exemplary embodiment of FIG. 12 was fabricated in 0.18 mm2 with a 28 nm Low Power (LP) CMOS process. The processor supports any lattice-based protocols with the modulus q of less than 224 while requiring an on-chip memory of only 31 kilobytes (kB). The processor of the present disclosure exhibited 3.18 times, 4.95 times, and 7.08 times improvement in a number of cycles, energy consumption, and standby time, respectively, compared with a conventional state-of-the-art implementations, i.e. the Kyber protocol of Round 1 done as a benchmark for a key generation for IND-CPA public key cryptography (PKE).

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A cryptographic processor device executing polynomial vector operations required for a post-quantum cryptography, comprising:
    a polynomial memory bank configured to store a plurality of polynomial vectors; and
    an arithmetic and logic operator configured to perform operation on the polynomial vectors,
    wherein the arithmetic and logic operator comprises:
    a transform operation circuit configured to multiply two polynomial vectors read out from the polynomial memory bank by using a predetermined transform operation including a plurality of operation stages, and comprising a combined operation unit configured to consecutively perform a first stage operation and a second stage operation among the plurality of operation stages without storing a result of the first operation stage in a memory;
    a lookup table configured to store modular operation values, for a particular modulus, of binary numbers corresponding to digits having a value of 1 among bit positions of an operand of a modular operation; and
    a modular multiplication operation circuit configured to perform a modular multiplication of two numbers by utilizing the modular operation values stored in the lookup table, and
    wherein the modular multiplication operation circuit comprises two-stage modulo-q compressors to minimize latency.

2. The cryptographic processor device of claim 1, wherein the transform operation circuit comprises:
    a sequence reordering unit configured to rearrange input coefficients belonging to any one of the two polynomial vectors; and
    the combined operation unit configured to receive sequence-arranged input coefficients and consecutively perform the first stage operation and the second stage operation on the sequence-arranged input coefficients.

3. The cryptographic processor device of claim 2, wherein the predetermined transform operation comprises Number Theoretic Transform (NTT).

4. The cryptographic processor device of claim 3, wherein the combined operation unit comprises a circuit having a 4-to-4 bijection structure in which a pair of butterfly circuits connected in series are connected in parallel.

5. The cryptographic processor device of claim 3, wherein the combined operation unit performs a NTT operation according to Cooley-Tukey algorithm or an inverse NTT operation according to Gentleman-Sande algorithm in response to a mode control signal.

6. The cryptographic processor device of claim 1,
    wherein the modular multiplication operation circuit is suitable for performing a modulo-q multiplication (where q is a k-bit number),
    wherein the modular multiplication operation circuit comprises:
    a multiplier configured to perform a normal multiplication on the two numbers and output an intermediate multiplication result;
    a first adder configured to add lower k bits of the intermediate multiplication result and modular-q values of the binary numbers corresponding to the digits having the value of 1 among bit positions higher than the k bits of the intermediate multiplication result to output an addition result; and
    a second adder configured to add lower k bits of the addition result and modular-q values of binary numbers corresponding to digits having the value of 1 among bit positions higher than the k bits of the addition result.

7. The cryptographic processor device of claim 1, further comprising:
    a polynomial sampler configured to generate random numbers and determine at least some of the plurality of polynomial vectors based on the random numbers by a sampling.

8. The cryptographic processor device of claim 1, wherein the polynomial memory bank comprises three memory banks.

9. The cryptographic processor device of claim 1, further comprising:
    a twiddle factor memory bank configured to store twiddle factors necessary for the predetermined transform operation.

10. A cryptographic processor device comprising:
    a cryptographic processor configured to execute polynomial vector operations required for a post-quantum cryptography; and
    an interface controller configured to control an operation of the cryptographic processor and provide an interface with an external device,
    wherein the cryptographic processor comprises:
    a polynomial memory bank configured to store a plurality of polynomial vectors; and
    an arithmetic and logic operator configured to perform operation on the polynomial vectors,
    wherein the arithmetic and logic operator comprises:
    a transform operation circuit configured to multiply two polynomial vectors read out from the polynomial memory bank by using a predetermined transform operation including a plurality of operation stages, and comprising a combined operation unit configured to consecutively perform a first stage operation and a second stage operation among the plurality of operation stages without storing a result of the first operation stage in a memory;
    a lookup table configured to store modular operation values, for a particular modulus, of binary numbers corresponding to digits having a value of 1 among bit positions of an operand of a modular operation; and a modular multiplication operation circuit configured to perform a modular multiplication of two numbers by utilizing the modular operation values stored in the lookup table, and wherein the modular multiplication operation circuit comprises two-stage modulo-q compressors to minimize latency.

11. The cryptographic processor device of claim 10, wherein the transform operation circuit comprises:

a sequence reordering unit configured to rearrange input coefficients belonging to any one of the two polynomial vectors; and the combined operation unit configured to receive sequence-arranged input coefficients and consecutively perform the first stage operation and the second stage operation on the sequence-arranged input coefficients.

12. The cryptographic processor device of claim 11, wherein the predetermined transform operation comprises Number Theoretic Transform (NTT), wherein the combined operation unit comprises a circuit having a 4-to-4 bijection structure in which a pair of butterfly circuits connected in series are connected in parallel.

13. The cryptographic processor device of claim 10, wherein the modular multiplication operation circuit is suitable for performing a modulo-q multiplication (where q is a k-bit number), wherein the modular multiplication operation circuit comprises:

a multiplier configured to perform a normal multiplication on the two numbers and output an intermediate multiplication result;

a first adder configured to add lower k bits of the intermediate multiplication result and modular-q values of the binary numbers corresponding to the digits having the value of 1 among bit positions higher than the k bits of the intermediate multiplication result to output an addition result; and a second adder configured to add lower k bits of the addition result and modular-q values of binary numbers corresponding to digits having the value of 1 among bit positions higher than the k bits of the addition result.

14. A data processing apparatus comprising:

a main processor; and a cryptographic processor configured to execute polynomial vector operations required for a post-quantum cryptography according to instructions and parameters from the main processor, wherein the cryptographic processor comprises:

a polynomial memory bank configured to store a plurality of polynomial vectors; and an arithmetic and logic operator configured to perform operation on the polynomial vectors, wherein the arithmetic and logic operator comprises:

a transform operation circuit configured to multiply two polynomial vectors read out from the polynomial memory bank by using a predetermined transform operation including a plurality of operation stages, and comprising a combined operation unit configured to consecutively perform a first stage operation and a second stage operation among the plurality of operation stages without storing a result of the first operation stage in a memory;

a lookup table configured to store modular operation values, for a particular modulus, of binary numbers corresponding to digits having a value of 1 among bit positions of an operand of a modular operation; and a modular multiplication operation circuit configured to perform a modular multiplication of two numbers by utilizing the modular operation values stored in the lookup table, and wherein the modular multiplication operation circuit comprises two-stage modulo-q compressors to minimize latency.

15. The data processing apparatus of claim 14, wherein the transform operation circuit comprises:

a sequence reordering unit configured to rearrange input coefficients belonging to any one of the two polynomial vectors; and the combined operation unit configured to receive sequence-arranged input coefficients and consecutively perform the first stage operation and the second stage operation on the sequence-arranged input coefficients.

16. The data processing apparatus of claim 15, wherein the predetermined transform operation comprises Number Theoretic Transform (NTT), wherein the combined operation unit comprises a circuit having a 4-to-4 bijection structure in which a pair of butterfly circuits connected in series are connected in parallel.

17. The data processing apparatus of claim 14, wherein the modular multiplication operation circuit is suitable for performing a modulo-q multiplication (where q is a k-bit number), wherein the modular multiplication operation circuit comprises:

a multiplier configured to perform a normal multiplication on the two numbers and output an intermediate multiplication result;

a first adder configured to add lower k bits of the intermediate multiplication result and modular-q values of the binary numbers corresponding to the digits having the value of 1 among bit positions higher than the k bits of the intermediate multiplication result to output an addition result; and a second adder configured to add lower k bits of the addition result and modular-q values of binary numbers corresponding to digits having the value of 1 among bit positions higher than the k bits of the addition result.

* * * * *